Figure 4A:
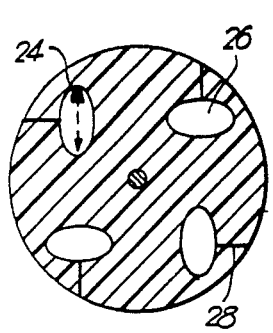

United States Patent [19]
Yataki

[11] Patent Number: 4,474,426
[45] Date of Patent: Oct. 2, 1984

[54] OPTICAL CABLES
[75] Inventor: Masamichi Yataki, Ottawa, Canada
[73] Assignee: Northern Telecom Limited, Montreal, Canada
[21] Appl. No.: 310,229
[22] Filed: Oct. 9, 1981
[51] Int. Cl.³ ............................................. G02B 5/16
[52] U.S. Cl. ...................... 350/96.23; 57/9; 264/1.5; 425/392
[58] Field of Search ...................... 350/96, 23; 264/1.5, 264/2.1; 57/9, 10, 11, 12; 425/224, 319, 324.1, 325, 391, 392, 402, 403

[56] References Cited
U.S. PATENT DOCUMENTS

| | | | |
|---|---|---|---|
| 4,154,049 | 5/1979 | King et al. | 57/9 |
| 4,155,963 | 5/1979 | De Vecchis et al. | 264/1.5 |
| 4,191,448 | 3/1980 | Dean et al. | 350/96.23 |
| 4,205,899 | 6/1980 | King et al. | 350/96.23 |
| 4,354,732 | 10/1982 | Arnaud et al. | 350/96.23 |

FOREIGN PATENT DOCUMENTS

| | | | |
|---|---|---|---|
| 1096566 | 3/1981 | Canada | 264/1.5 |
| 1578439 | 11/1980 | United Kingdom | 350/96.23 |

Primary Examiner—John D. Lee
Attorney, Agent, or Firm—Stuart L. Wilkinson

[57] ABSTRACT

In a known optical cable, optical fibers are loosely laid in a number of grooves formed within an elongate plastics extrusion. Typically the grooves follow a helical path with periodically reversing pitch, the helices centered on a central longitudinal axis of the cable. A primary reason for the helical lay is to prevent the fibers from becoming stressed should a bend occur in the cable. A further benefit of loose laying of fibers in a helical groove of periodically reversing pitch is that any elongation of the cable core is not immediately transmitted to the fiber supported by it. The fiber will move from its initial loose laid position both in a direction towards the inside curve of the helix and in a direction towards the base of the grooves. When it bears against the cable core over an appreciable length, the fiber will then be subjected to tensile stress. By the invention, tolerance to core elongation is increased by arranging that the grooves at any point along the core cant towards the outside curve of the helix.

21 Claims, 11 Drawing Figures

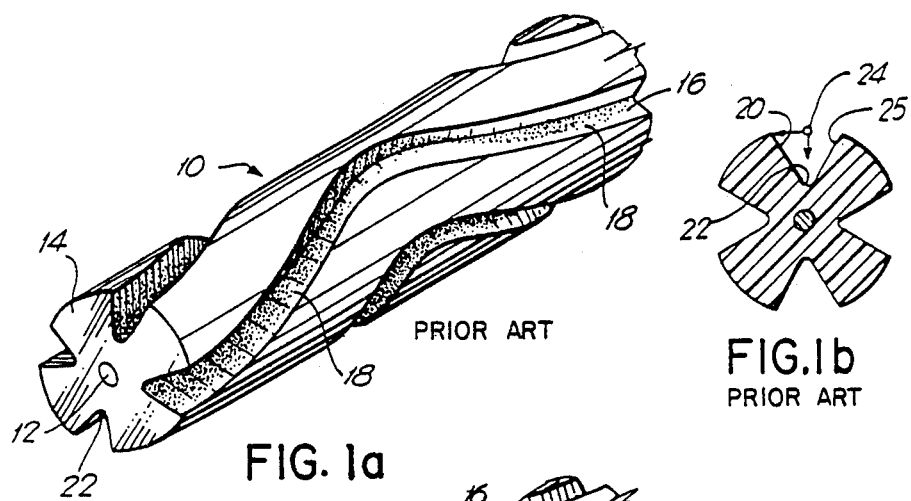
FIG. 1a PRIOR ART
FIG. 1b PRIOR ART
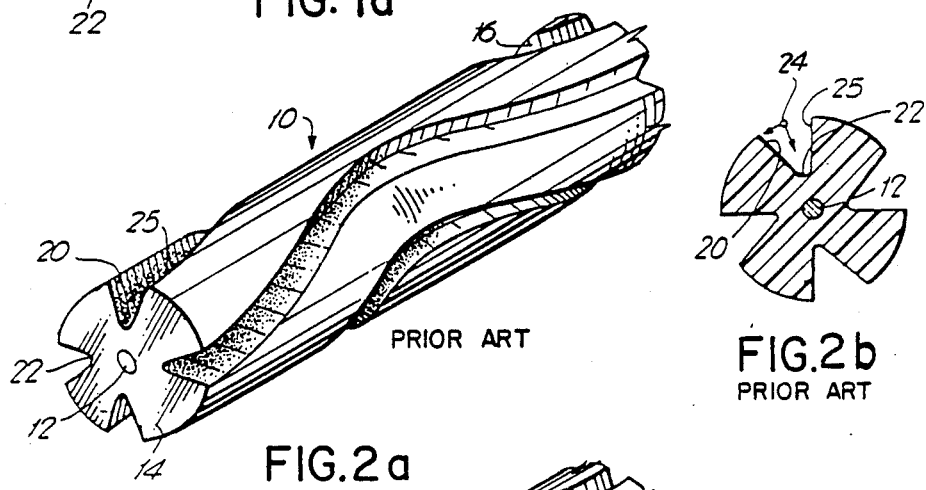
FIG. 2a PRIOR ART
FIG. 2b PRIOR ART
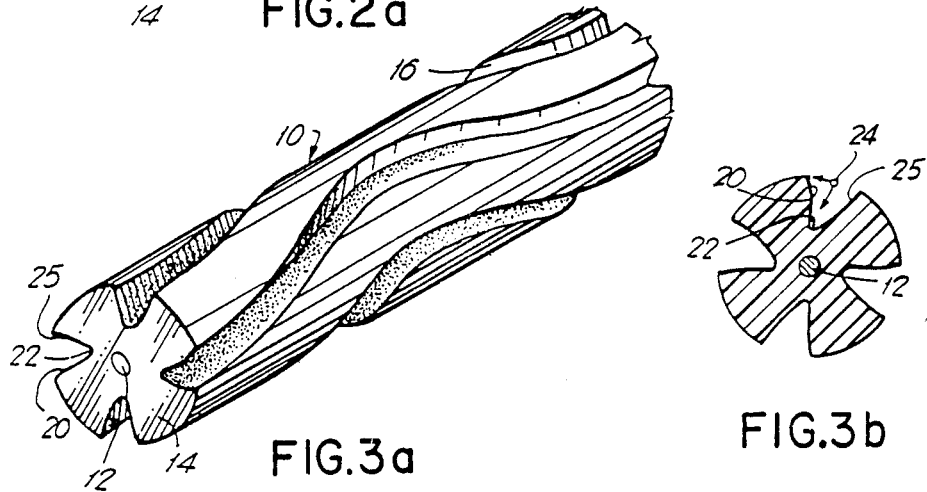
FIG. 3a
FIG. 3b

OPTICAL CABLES

This invention relates to optical cables and particularly to optical cables in which optical fibers are so located as to tolerate some elongation of the cable core.

In a known optical fiber cable design, fibers are loosely laid in grooves extending along a central strength member, the grooves having periodically reversing helical path, with helices centered at a central longitudinal axis of the cable. Such a cable is described in U.S. Pat. No. 4,205,899.

With a helical lay, the cable can bend without unduly stressing the laid-up fibers since compressive forces to which the fibers are subjected on an inside curve of the cable bend are essentially neutralized by tensile forces to which those same fibers are subjected on an outside curve of the cable bend. Loose laying of the fibers permits some relative longitudinal movement between cable core and fibers whereupon the tensile and compressive stresses negate one another. Loose laying of the fibers is further advantageous in that, if the cable core is elongated, then the fibers can move in surrounding "free space" to avoid being subjected to tensile stress. As cable core elongation occurs, the fibers will move radially inward and tangentially towards the inside curve of the helix at any particular point along the cable.

In order to maximize the "free space" available for such fiber movements, the groove shape and orientation relative to the cable core axis should be optimized.

According to one aspect of the invention, there is provided an elongate extrusion for an optical cable, the extrusion having a periodically reversing helical compartment for housing at least one optical fiber, the compartment helix centered on a central longitudinal axis of the extrusion, the compartment having side walls diverging radially outward from a base region thereof, the side wall on an inside curve of the helix being more nearly inclined to a radius extending through the base region than is the side wall on the outside curve of the helix.

According to another aspect of the invention, there is provided a cable or cable unit incorporting an extrusion as hereinbefore defined, the compartments having at least one optical fiber therein. The extrusion can have a sheath extending therearound.

Preferably the extrusion has a plurality of such compartments extending along it. The extrusion is preferably a solid extrusion having grooves in an outer surface thereof. The grooves can, for example, be of generally V section having an angled, concave or convex base region. The extrusion can be a plastics extrusion having a central strength member of, for example, stranded wire.

The extrusion can alternatively be annular in form. In addition, the compartments can alternatively be generally elliptical in cross-section, having a longer aspect so inclined to the radial direction that when the extrusion is elongated, loosely laid fibers within the compartments tend to move in the direction of said longer aspect.

According to another aspect of the invention, there is provided a method of making an elongate extrusion for an optical cable, the method comprising extruding plastics through a die, and forming periodically reversing helical compartments in the extruded plastics such that at any point along the extrusion, orientation of a compartment relative to the core central axis is related to the pitch direction of the helical compartment at that point.

According to yet another aspect of the invention, there is provided apparatus for making an elongate support member for an optical cable, the apparatus comprising extrusion means for extruding plastics through a die, forming means for forming at least one compartment in the plastics extrusion which compartment is located on a periodically reversing helical path with reversing helix centered on a central axis of the extrusion, and adjustment means for altering the orientation of the compartment relative to said central axis, said forming and said adjusting means having linked drives whereby to relate the compartment orientation at any point of the extrusion to the helical pitch direction at that point.

Figure 4B:
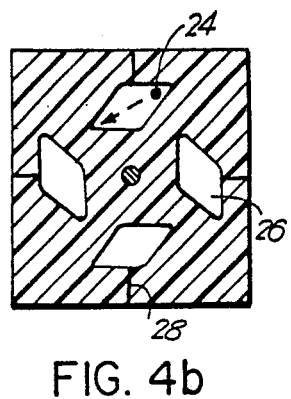
Figure 4C:
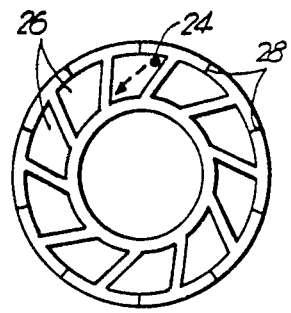
Figure 5:
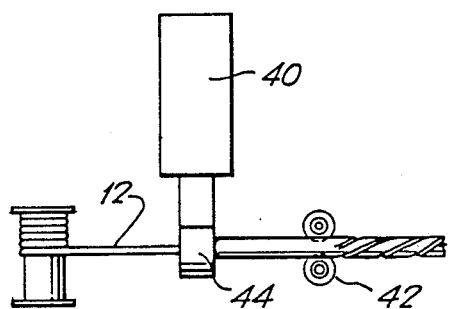
Figure 6:
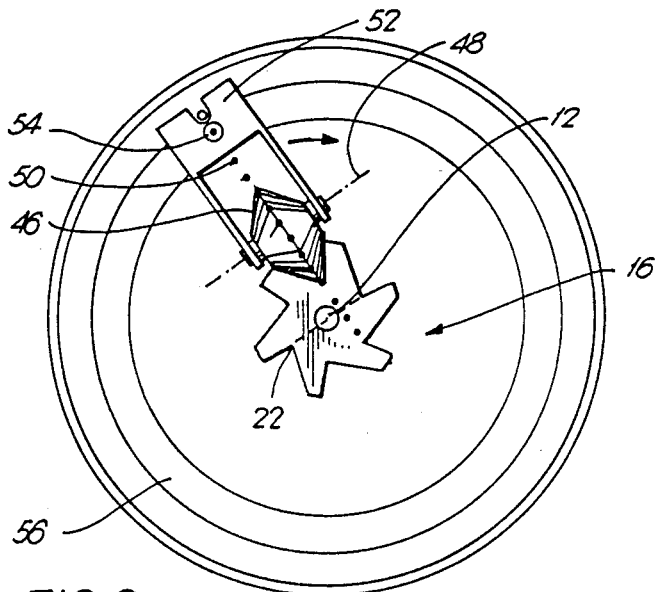

An embodiment of the invention will now be described by way of example, with reference to the accompanying drawings in which:

FIGS. 1(a) and 2(a) marked PRIOR ART, are perspective views of known optical cable filament or strength member;

FIG. 3(a) is a perspective view of an optical cable filament or strength member embodying the invention;

FIGS. 1(b), 2(b) and 3(b) are cross-sectional views to a larger scale through the cable filaments of FIGS. 1(a), 2(a), and 3(a) respectively;

FIGS. 4(a), 4(b), and 4(c) show cross-sectional views through alternative forms of cable and cable unit according to the invention;

FIG. 5 shows apparatus for use in manufacturing optical cable filament as illustrated in FIG. 3(a); and FIG. 6 shows a detail of the FIG. 5 apparatus.

Referring to the drawings in detail, FIG. 1(a) shows a central filament 10 for an optical cable. The filament has a central stranded steel wire strength member 12 and, extruded over the strength member, a sleeve 14 of high density polyethylene. Formed in a surface of the sleeve and extending throughout the length of the filament are four grooves 16 which are evenly circumferentially spaced around the filament central axis. As shown in FIG. 1(b) the grooves 16 have a V-section with a concave base region 22. In use, the grooves 16 each accommodate one or more optical fibers which are relatively loosely laid within the grooves. Once the fibers are so laid, the central filament 10 is surrounded by a cable sheath, (not shown).

In order to prevent tensile and compressive stresses from breaking the fibers when the optical cable is bent, the grooves 16 are made to follow a helical path around the longitudinal axis of the filament. As a result, an optical fiber located on a bend is alternately subjected to tensile and compressive stresses which, since the fibers are loosely laid, essentially compensate for one another. At regular intervals 18, the various helical paths followed by the grooves change hand or pitch direction.

As described in U.S. Pat. No. 4,205,899, such a reverse pitch or so-called SZ extrusion can be made using relatively simple equipment. Thus, although not shown herein, a stranded steel wire core and a charge of high density polyethylene are fed into an extrusion unit so that the polyethylene is extruded around the core. A fixed non-rotatable extrusion die has an aperture with four fingers extending radially inward to form the grooves. Some way downstream of the extrusion unit, the filament, having been cooled, becomes relatively rigid. This permits it to be safely gripped by a twist unit which is operated to twist the filament firstly in one direction and then in the opposite direction so as to introduce the reverse lay helical form to the grooves where the polyethylene is still malleable as it exits the extrusion unit.

Changes in pitch direction of the helical grooves take place at corresponding positions along the length of the filament.

Although, as shown in the idealized form of filament illustrated in FIGS. 1(a) and 1(b), the groove or V section is symmetrical about a plane through the core axis, in fact, because of the manner in which the extrusion is made, the V grooves in the solidified material are found to be canted over. As shown in FIGS. 2(a) and 2(b) a groove wall 25 on the outside of the helical curve is more closely inclined to a radius through the groove base 22 than is the other wall 20 at a particular point along the filament. Because the helical grooves reverse periodically along the length of the filament, the orientation of the groove relative to the filament central axis also changes as illustrated in FIG. 2(a).

As previously mentioned, in optical cables it is desirable to have optical fibers loosely laid so that they are minimally stressed. Stress is undesirable since it can affect transmission characteristics and, at high level, can cause fiber breakage.

Depending on the particular cable dimensions, a fiber laid up in the cable will be characterized by a certain amount of free space; that is, the extent to which the fiber can rove towards the core axis and towards a groove side wall before it becomes stressed. For the reverse lay helical cable of FIG. 1(a) the free space necessary to avoid stress introduced by cable elongation $\xi$ is as follows:

$$\frac{(\pi - \delta)}{\pi} \frac{(D - 2h)}{D} \leq 1 - \frac{2P^2 \xi}{\pi^4 D^2} \qquad 1$$

h=radial freedom
p=helical pitch length
D=helical pitch circle diameter
$\delta$=tangential freedom To relieve stress, the fiber moves both radially inward and tangentially towards the inside of the helical curve. However, with the symmetrical orientation of FIG. 1(b), if a fiber 24 initially located centrally of a groove at the notional surface of the core, moves its full permitted extent tangentially and bears against the side wall 20 of the groove, it cannot move radially inwardly. Alternatively, if the fiber 24 moves inwardly to the base region 22 of the groove, then it cannot move tangentially. Obviously, the grooved shape is not optimized for stress relief. The groove orientation of FIG. 2(b) is even worse. Here, if a fiber 24 located centrally at the notional surface of the core moves radially inward, it cannot reach the base region 22 of the groove. Should the fiber also move tangentially, then it will bear against the surface 20 of the groove at a position relatively close to the notional surface of the core. Alternatively, if there is tangential movement of the fiber 24 towards the inside of the helical curve, then permitted inward radial movement to relieve stress is minimal.

Turning now to FIGS. 3(a) and 3(b), there is shown a cable central filament similar to that of FIG. 2(a), except in one respect, this being that the V section grooves are canted in the opposite direction. As will be understood from the previous discussion of the shortcomings of the FIG. 1(a) and 2(a) embodiments, the orientation of the grooves with respect to the helical path followed by them permits appreciable movement of a fiber 24 both radially inward and tangentially towards the inside of the helical curve in order to relieve stress.

FIGS. 4(a), 4(b) and 4(c) show extrusions having similar groove or compartment arrangements in which free space afforded to a fiber permits both inward radial movement and tangential movement towards the inside of a helical curve. Although purely sectional views are shown, it will be understood that the pitch directions at the cross-sectional planes illustrated correspond to that shown in FIG. 1(a). In each of these Figures, a fiber 24 is shown in its loose laid position. Also indicated is the direction in which the fiber might tend to move when the cable suffers core elongation. In each of the three examples illustrated, fibers are let into compartments 26 through narrow passages 28 formed in the extrusion. The FIG. 4(a) and 4(b) examples being based on a solid extrusion, functions as the core of a cable or cable unit whereas the FIG. 4(c) embodiment forms one layer of a concentrically layered cable or cable unit.

From equation I mentioned previously, it can be seen that the tangential and radial movements of the fiber occuring when cable elongation takes place depend on pitch length, pitch circle diameter and the interval length between changes of pitch. From these three parameters, an optimum shape and orientation can be chosen for the compartments occupied by the fibers. When so optimized, and if cable core elongation takes place, a fiber initially located at the radially outward extremity of a compartment, moves unfettered to the radial inward extremity of the compartment.

Referring now to FIG. 5, there is shown a schematic representation of apparatus used in the manufacture of the optical cable filament of FIG. 3(a). Basically, the apparatus comprises an extrusion unit 40 and a forming unit 42. In use, a stranded steel wire 12 and a charge of high density polyethylene are fed into the exrusion unit. The polyethylene is heated until malleable and then extruded around the steel wire core through a die 44 having a circular aperture. A short way downstream of the extrusion unit where the plastics extrusion is still malleable, a series of rollers 46, one of which is shown in end view in FIG. 6, are mounted at evenly spaced locations around the extrusion central axis. The forming rollers 46 are mounted for rotation about axes 48 and have planes of symmetry indicated by the chain lines 50. By rotation of a supporting frame 52 about mounting position 54 each of the rollers 46 can be reorientated relative to the core axis. The rollers 46 can consequently be orientated to produce in a surface of the extrusion a groove shape having one side wall inclined closer to a radius (broken line), extending through base region 22 than the inclination of the opposed wall. The roller mountings 54 are secured to a carriage which can be oscillated about the extrusion axis to introduce the reverse helical formation shown in FIG. 3(a). Drives (not shown) to the carriage 56 and the frames 52 are linked to ensure that the degree of canting of the grooves 16 is exactly related to the pitch direction of the reversing helical path followed by the grooves. The filament with the grooves so formed is wound onto a take-up drum after being pulled through a cooling unit (not shown).

Although it is preferred to have the extrusion and forming functions separate, they can alternatively be combined. Thus a die can be used having a circular aperture and a number of inwardly extending fingers projecting into the aperture to form the grooves. As described in U.S. Pat. No. 4,205,899, a twist unit downstream of the extrusion unit is operated to twist the filament firstly in one direction and then in the opposite direction. By appropriately mounting the fingers for a rocking movement and by applying a linked drive to the fingers and the twist unit, the helix related orientation of the grooves can also be obtained.

What is claimed is:

1. An elongate extrusion for an optical cable, the extrusion having a periodically reversing helical compartment for housing at least one optical fiber, the compartment helix centered on a central axis of the extrusion, the compartment having side walls diverging radially outwardly from a base region thereof, and wherein at any point along the extrusion, the side wall on an inside curve of the helix is more nearly inclined to a radius extending through the base region than is the side wall on the outside curve of the helix.

2. An elongate extrusion for an optical cable, the extrusion having a periodically reversing helical compartment for housing at least one optical fiber, the compartment helix centered on an axis of the extrusion and having an outermost radial extremity and an innermost radial extremity, which extremities are radially misaligned, the compartment helix having a pitch length, a pitch circle diameter, and a periodic pitch reversal such that on longitudinal elongation of the extrusion, a fiber located within the compartment and positioned at said outermost radial extremity tends to move in a direction towards said innermost radial extremity.

3. An elongate extrusion for an optical cable, the extrusion having helical compartments therein for loosely receiving optical fibers, the compartments following helical paths along the extrusion around a central axis thereof, the helix direction changing periodically along the extrusion whereby when the extrusion stretches, a loosely laid optical fiber within such a compartment moves relatively radially inwardly and moves tangentially towards an inside curve of the helical path to produce in aggregate inclined movement, each compartment having a cross-sectional area with an elongate aspect which at any point along the extrusion extends generally in the direction of the aggregate inclined movement of an optical fiber received therein so as to limit tensile stress on the optical fiber when the extrusion stretches.

4. An elongate extrusion as claimed in claim 3, in which the compartments are of generally elliptical cross-section.

5. An elongate extrusion as claimed in claim 3, the extrusion being generally annular in form.

6. An elongate extrusion as claimed in claim 3 in which the compartments are grooves formed in the outer surface of the extrusion.

7. An elongate extrusion according to claim 3 or 6 in which the extrusion surrounds and keys to a central strength member.

8. An elongate extrusion as claimed in claim 6, in which the grooves are of V section.

9. An elongate extrusion as claimed in claim 6, in which a base region of each of the grooves is angled.

10. An elongate extrusion as claimed in claim 6, in which a base region of each of the grooves is concave.

11. An elongate extrusion as claimed in claim 6, in which a base region of each of the grooves is convex.

12. A method of manufacturing an elongate support member for an optical cable, the method comprising extruding plastics through a multi-fingered die to form an extrusion having helical grooves in a surface thereof and, during extrusion, changing the helix direction of the grooves and oscillating the individual fingers of the die substantially in phase with the change in helix direction whereby the orientation of grooves in the surface of the extrusion is related to the helix direction in such a way as to limit tension in optical fibers located within the grooves caused when the extrusion stretches.

13. Apparatus for making an elongate support member for an optical cable; the apparatus comprising means for extruding plastics through a die shaped to form compartments along the extrusion, each compartment having a cross-sectional area of elongate aspect, forming means for causing the compartments to follow helical paths, the helical paths extending around a central axis of the extrusion and being of periodically changing helix direction along the extrusion, and adjustment means for altering the orientation of the compartments as a function of helix direction so that at any point along the extrusion, the elongate aspect of each compartment is inclined both to a radial and a tangential direction with a radially inner part of the compartment being closer to an inside curve of the helical path at that point than is a radially outer part of the compartment.

14. Apparatus as claimed in claim 13, in which the die is a fixed die and said forming means comprises a roller downstream of the extrusion means, which roller bears against the extrusion to form a groove therein, the roller mounted on a carriage rotatable about the cable axis, the roller so mounted on the carriage to permit a roller axis of rotation to be rocked back and forth whereby to relate orientation of the qroove to position on the reverse helix.

15. Apparatus as claimed in claim 14, in which the roller is one of a plurality of identical rollers mounted in circumferentially evenly spaced relationship about the extrusion central axis.

16. Apparatus as claimed in claim 15, in which the die is fixed and has a circular aperture.

17. Apparatus as claimed in claim 15, in which the die is fixed and has an annular aperture.

18. Apparatus for making an elongate support member for an optical cable, the apparatus comprising extrusion means for extruding plastics through a die and forming means for forming a periodically reversing helical compartment in the extrusion, the helix followed by the compartment centered on a central axis of the extrusion, and adjustment means for altering the orientation of the compartment relative to the surface of the extrusion, said forming means and said adjustment means linked whereby to relate the compartment orientation at a particular point of the extrusion to the helical pitch direction at that point so as to limit tension in optical fibers located within the compartments caused when the extrusion stretches, the die having a plurality of fingers extending into a central aperture through the die, the fingers being oscillatable about an axis therethrough parallel to a central axis of the plastics extrusion.

19. Apparatus as claimed in claim 18, further comprising rocker means to rock the fingers.

20. Apparatus as claimed in claim 19, further comprising a twist means downstream of the extrusion means to grip the extrusion at a position remote from the die where the extruded material is relatively rigid, thereby to twist the extrusion and to introduce a reverse lay helical form to the grooves as the extruded plastics exits the die.

21. Apparatus as claimed in claim 20, in which drive to said twist means and drive to said rocker means are mechanically linked.

* * * * *